Jan. 15, 1935.
P. M. SALERNI
Re. 19,428
POWER TRANSMISSION MECHANISM
Original Filed March 4, 1932 3 Sheets-Sheet 1
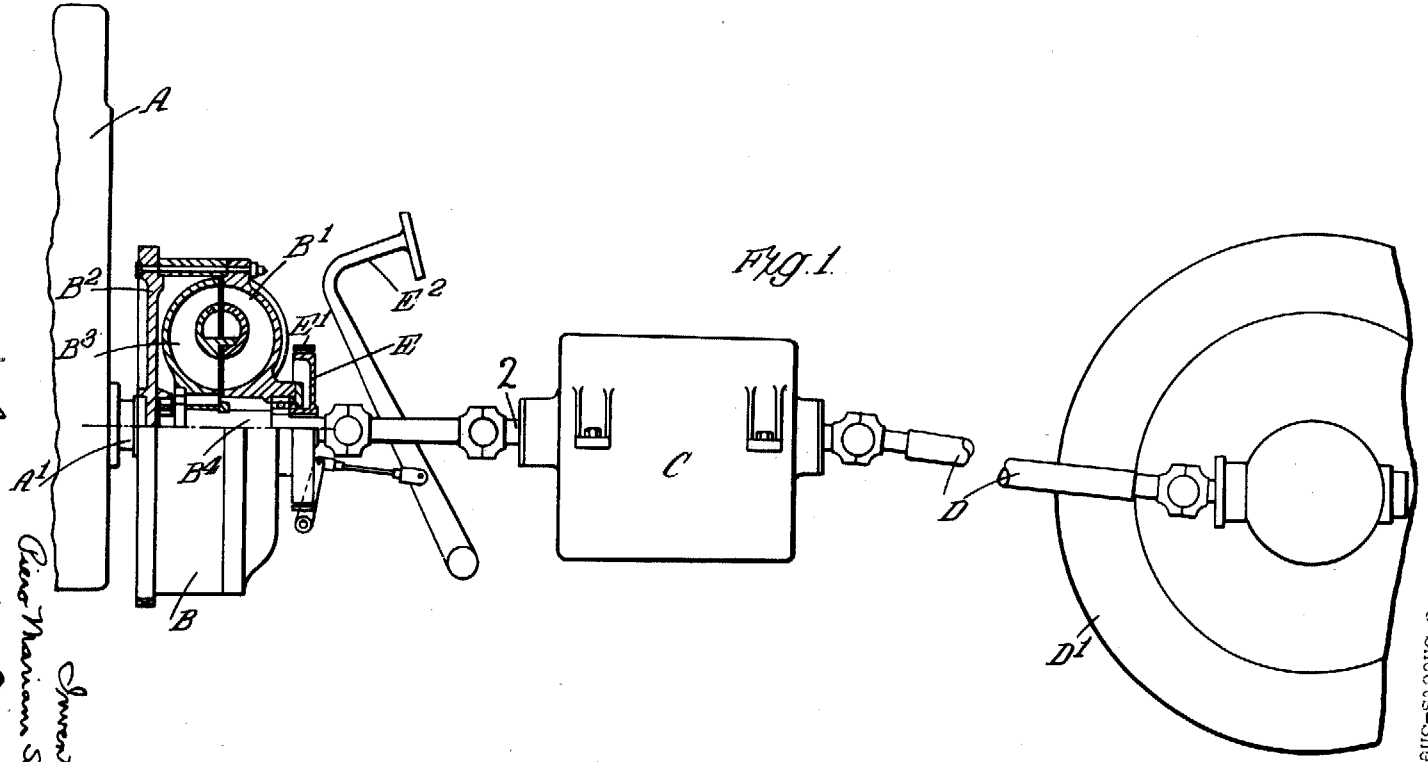
Inventor
Piero Mariano Salerni
By Cushman, Darby & Cushman
Attorneys Jan. 15, 1935. P. M. SALERNI Re. 19,428
POWER TRANSMISSION MECHANISM
Original Filed March 4, 1932 3 Sheets-Sheet 2
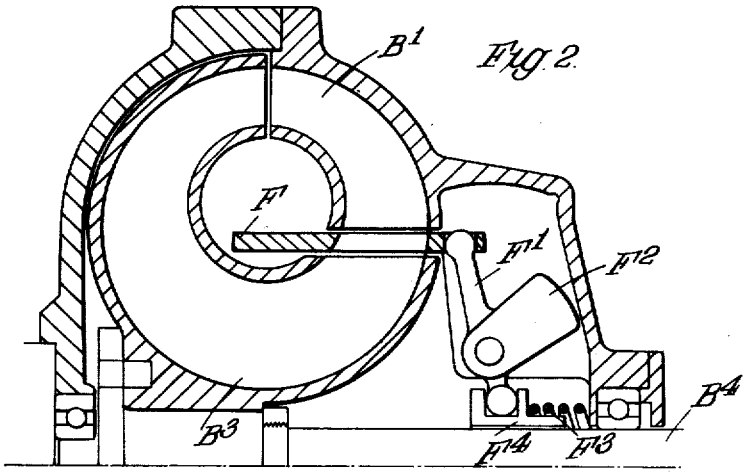
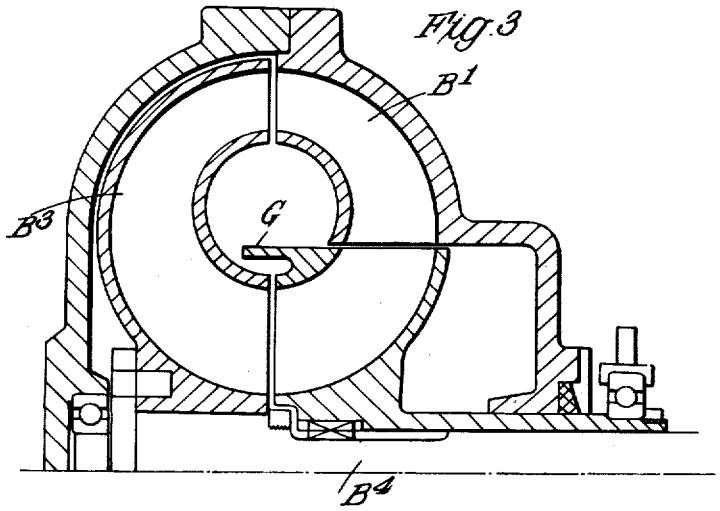
Inventor
Piero Mariano Salerni
By Lupleman, Dugan & Darby & Cushman
Attorneys Jan. 15, 1935. P. M. SALERNI Re. 19,428

POWER TRANSMISSION MECHANISM

Original Filed March 4, 1932 3 Sheets-Sheet 3

Inventor

Piero Mariano Salerni

By Cushman, Darby & Cushman

Attorneys

Reissued Jan. 15, 1935 Re. 19,428

UNITED STATES PATENT OFFICE 19,428

POWER TRANSMISSION MECHANISM

Piero Mariano Salerni, Westminster, England

Original No. 1,863,128, dated June 14, 1932, Serial No. 596,852, March 4, 1932. Application for reissue October 12, 1933, Serial No. 693,384. In Great Britain May 15, 1930

4 Claims. (Cl. 74—293)

This invention relates to power transmission mechanism for motor driven vehicles.

According to this invention the power transmission mechanism comprises in combination, a hydraulic power transmitter of the type hereinafter referred to, with a positive change speed gear also defined below, the latter being adapted for easy changing without necessarily disconnecting or declutching from the engine, by the provision of interrupting means at any suitable position in the transmission whereby upon the latter being interrupted during gear change, it remains interrupted until due to acceleration or deceleration of the engine end of the transmission relatively to the driven road wheel end, automatic reconnection is effected when synchronism or substantial synchronism between the parts to be connected is attained. The hydraulic power transmitter is of the type (sometimes called the "Fottinger" type) comprising an impeller or driving vane wheel and a turbine or driven vane wheel arranged so as to provide a closed circuit in which liquid circulates under a difference of head maintained by centrifugal action due to the difference in speed of rotation of the impeller and the turbine so that the angular momentum imparted to the liquid by the impeller is utilized in or by the turbine to enable power to be transmitted. Any suitable or known means may be provided for varying the circulation or action of the liquid in the hydraulic transmitter. The positive change speed gearing which is used in the combination according to this invention is of the type in which power is transmitted through solid material under shear, bend or compression loads without possibility of friction slip, as distinct from change speed gearing in which power is transmitted by or through friction clutches or bands or in which the reaction of the drive is taken by frictional means as in some types of epicyclic gearing, and as previously stated, the said positive change speed gearing is capable of being readily actuated to effect gear changes because of the aforesaid interrupting or synchronizing means provided in the transmission, without necessarily disconnecting the hydraulic transmitter from the engine. The expression "friction slip" is intended to mean relative movement of surfaces in frictional contact through which power is transmitted by friction as for instance in a common friction clutch. It will be seen that, by the combination of change speed gearing with synchronizing means and a hydraulic power transmitter in which power is transmitted by the kinetic energy of fluid, the invention provides a transmission mechanism for motor-driven vehicles which renders unnecessary the use of frictional connections, such as a friction clutch, gear bands or the like, thus precluding all possibility of friction slip. It is significant to note that no means have heretofore been provided for utilizing the power of an internal combustion engine to drive a vehicle including change speed gearing which do not involve in certain circumstances slip between surfaces in frictional contact with the detrimental result that in certain vehicles where power at exceptionally high torque has to be transmitted, in order to eliminate the possibility of friction slip, the convenience of change speed gearing is usually foregone and the power of the internal combustion engine converted into electrical energy, because with the high torques prevailing in such vehicles, friction slip would have serious consequences. With a transmission mechanism made in accordance with the present invention, friction slip is eliminated both when starting the vehicle from rest and during changes of gear ratios, however rapidly the latter may be effected. The interrupting or synchronizing means may be combined with the change speed gearing, and in this respect the change speed gearing or mechanism may be that set forth in my United States patent application Serial No. 487,187, filed October 8, 1930, or the said means may be located at any suitable position in the transmission mechanism for interrupting the drive. The said means may thus be one of a number of synchronizing devices associated with individual gears or may comprise or be in the form of a Salerni coupling such as described in my United States Patent No. 1,836,773 or a free wheel device located elsewhere in the transmission for the purpose specified. No claim is made in the present specification to any of the individual devices above referred to per se, as the invention consists in the particular combination of the devices in a power transmission mechanism of a motor driven vehicle as hereinbefore referred to.

In order that the said invention may be clearly understood and readily carried into effect, the same will now be more fully described with reference to the accompanying drawings, in which:

Figure 1 is a diagrammatic view illustrating the power transmission mechanism of a motor vehicle comprising a hydraulic transmitter and a change speed gearing having associated or combined therewith rotational or static synchronizing devices as described in my United States patent application, Serial No. 487,187.

Figures 2 and 3 are fragmentary sectional views illustrating two examples of means for varying or controlling the circulation of the liquid within the hydraulic power transmitter.

Figure 4:
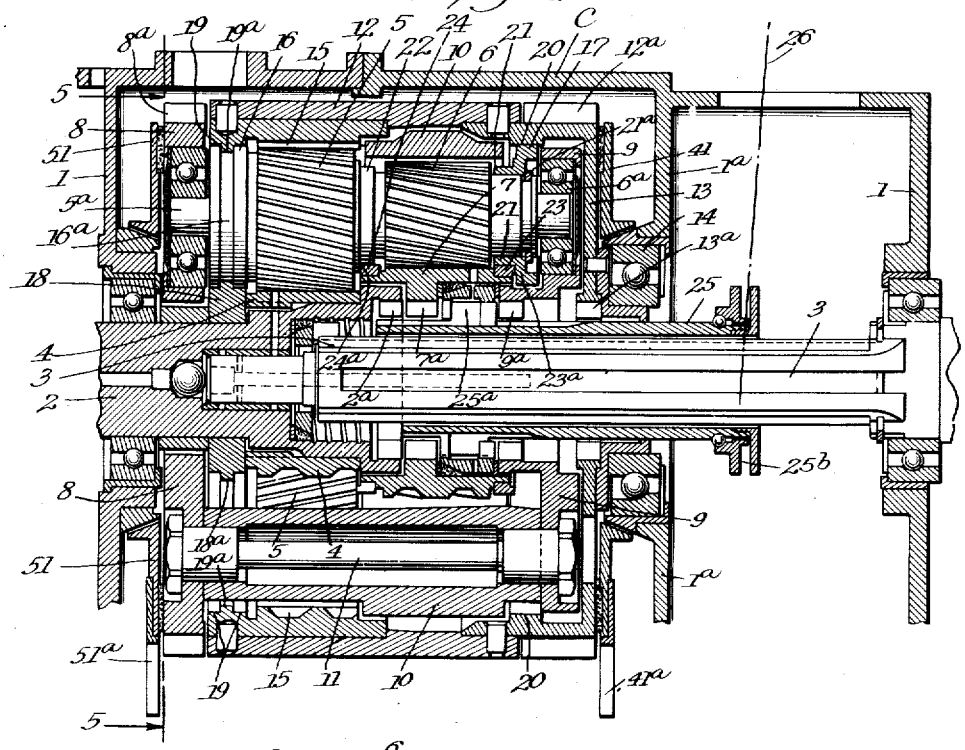
Figure 4 is a vertical longitudinal sectional view of a positive change speed gearing and synchronizer of the type with which the invention may be associated.

Referring to Figure 1, A indicates the engine, B is the hydraulic power transmitter of the type hereinbefore referred to, C is the change speed gearing which may have associated therewith the interrupting or synchronizing means covered in my United States application Serial No. 487,187, and D is the propeller shaft which is connected with and drives the rear wheel axle carrying the driven road wheels $D^1$ in the ordinary way. The impeller or driving member $B^1$ of the hydraulic transmitter as shown is bolted to a plate $B^2$ secured on the engine shaft, so that the latter drives the impeller. The turbine or driven element of the hydraulic transmitter is represented at $B^3$ and is fixed on the driven shaft $B^4$ which is suitably connected with the main shaft 2 of the change speed gearing C. The vanes of the impeller $B^1$ and those of the turbine $B^3$ are arranged in any suitable or usual manner within the passage wherein the liquid is circulated when the impeller is rotated in the well known manner in order to cause the turbine or driven element $B^3$ and the main shaft 2 of the change speed gearing to be rotated in the usual way. This is a well known type of hydraulic power transmitter and needs no further description so far as the present invention is concerned. The change speed gearing C in the example shown is, as aforesaid, set forth in my United States patent application Serial No. 487,187 and it may be actuated to make the necessary gear changes by hand operated means as set forth in the patent specification. This gearing as described in the patent specification referred to, is associated with interrupting or synchronizing means whereby the road wheel end of the transmission is allowed during gear change to over-run or under-run the engine end, thus providing an interruption in the transmission which remains interrupted until due to acceleration or deceleration of the engine end relatively to the road wheel end, automatic reconnection is effected when synchronism either rotationally or statically (in the latter case so far as the members that take the reaction of the drive are concerned) is attained, this being fully described in the aforesaid United States patent application Serial No. 487,187 so that further description herein is unnecessary. By this arrangement, gear changes can be effected without necessarily disconnecting the hydraulic power transmitter, the provision of the fluid medium within the transmitter ensuring in conjunction with the said synchronizing means that change of gear is effected smoothly and without shock. Although in the particular example illustrated the synchronizing mechanism is incorporated with the gearing, it may be provided at any suitable position in the transmission mechanism so that the same result is attained. For the purpose of making "racing" changes, that is, changes made regardless of engine speed, and which necessitate the interruption of the transmission of torque to parts in the change speed gearing, it may be desirable to retard or prevent rotation of the turbine or driven element $B^3$ of the hydraulic transmitter, and for this purpose, the driven shaft $B^4$ of the said turbine has secured thereon, in the example shown, a drum E around which is a brake band $E^1$ that can be actuated by a pedal or lever $E^2$. By depressing the pedal $E^2$ the brake band $E^1$ is caused to grip the drum and thus prevent or retard rotation of the driven shaft and the turbine or driven element $B^3$ of the hydraulic transmitter. It is pointed out that the function of this brake is not the same as that of devices sometimes used in automobile transmission systems of the known type, that is, systems comprising a friction clutch, friction bands or the like, which are commonly described as "clutch-stops", because, whereas the function of a clutch-stop is not the resisting of engine torque but merely the arresting of the rotational movement of friction clutch members and other parts when the latter are disconnected from the engine, which disconnection is effected by disengagement of the friction clutch, in apparatus according to my invention, owing to the fact that disconnection of the turbine from the engine cannot be effected, although the amount of torque transmitted to the turbine can be appreciably reduced by the use of valve means of the kind hereinafter referred to, it can never be interrupted completely as, even when the circuit is completely obturated by the valve, the transmission of power by the kinetic energy of the fluid is bound to continue due to eddy circulation between the vanes at their inlets and outlets which, at high speeds, is very appreciable, the function of the brake is to decrease the rotational speed of, or arrest, the turbine against such torque as may be imparted to it by the engine. This in no way results in an interruption of the engine torque transmitted to the turbine, but in an increase in the hydraulic slip in the transmitter. The provision of brake means to absorb the torque inevitably imparted, unless the transmitter be emptied, to the turbine element of a hydraulic transmitter of the Fottinger type, enables the transmission of engine torque to parts in the change speed gearing to be interrupted, thus enabling "racing changes" to be effected. The hydraulic transmitter may be provided with a known form of valve which can be operated for the purpose of controlling or varying the circulation or action of the liquid in the transmitter, for instance to increase slip when the engine develops low power and thus avoid likelihood of the engine stalling, and in the example shown in Figure 2, the valve is in the known form of a ring that can be axially moved from the position shown wherein it is fully open, into any desired position, so that the obturating portion of the valve can project to any desired extent across the liquid circuit and thus reduce the passage for the liquid. The said controlling valve may be moved at will, for example, by a hand lever or pedal in any suitable or known manner, or it may be moved by automatic means which in the example illustrated in Figure 2 comprise a series of levers such as F, each of which has a weight $F^2$ which can move under the influence of centrifugal force. Normally the valve is held in the fully open position by the weighted levers assuming the position shown under the influence of centrifugal force, and as the speed decreases and reduces the centrifugal action, the said levers are displaced to move the valve across the liquid circuit or passage, this movement being assisted by the spring $F^3$ acting on the slidable member $F^4$ cooperating with the inner ends of the levers. In the example shown in Figure 3, part of the turbine or driven element is constituted by a slidable member having a controlling valve thereon and by axially moving this member in the direction shown, the hydraulic circuit can be controlled or varied as aforesaid.

Figure 5:
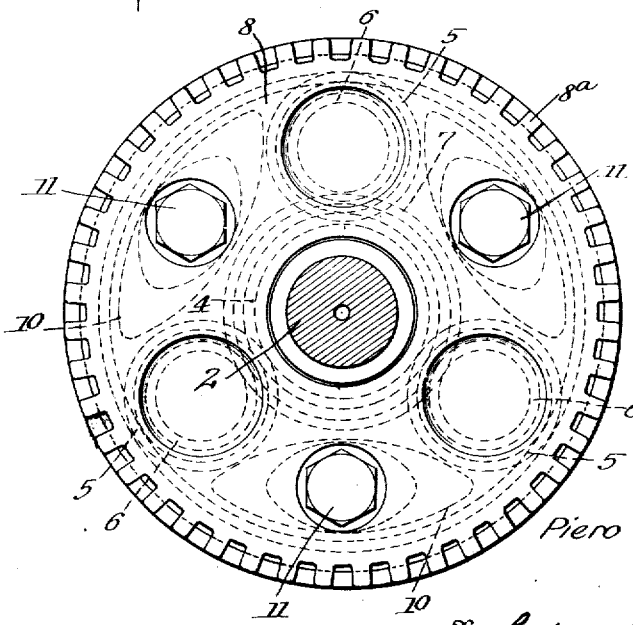
Figure 5 is a sectional view taken substantially on the line 5—5 of Figure 4.

The casing C which houses the gear and the interrupting means or synchronizers is provided with the end portions 1 (Figure 4). The drive shaft 2 is supported in the ball bearing in one of the end portions 1 while the driven shaft 3 is journaled in a ball bearing at the other end of the casing. The inner or free end of the driven shaft 3 is formed with a spigot that fits within the inner end of the driving shaft 2 as shown in Figure 4. The driving shaft 2 is formed with or has secured thereon a driving sun gear wheel 4 which is in mesh with the larger planet pinions 5 of preferably three compound planet pinions (Figure 5) of which the smaller pinions 6 are in mesh with a driven sun gear wheel 7 of annular or hollow formation as shown. The compound planet pinions 5 and 6 are supported at their ends in ball bearings 5*a* and 6*a* mounted in end plates 8 and 9 that form parts of a cage body or carrier 10. The end plates 8 and 9 in the example shown are secured to the cage body 10 by means of bolts 11 that extend through bosses on the cage body and are secured in position by nuts to clamp the end plates securely to the cage body 10. The body and the end plates are preferably made of duralumin. Surrounding the said cage body 10 is an annulus 12 which at the rear end is formed or provided with a plate 13, having an inner part mounted in a ball bearing 14 supported in a diaphragm or web 1*a* that forms a part of the casing C, the said annulus 12 being provided with internal teeth 15 with which mesh the larger planet pinions 5 of the three compound planet pinions.

In the example illustrated, the teeth of the different gear wheels and pinions are of helical formation. At or near the ends of each of the compound planet pinions are provided rollers or circular bearing surfaces 16 and 17, the diameters of which are equal to the diameters of the pitch circles of the larger planet pinions 5, the three rollers 16 being adapted to travel around a roller support or circular bearing surface 18 which is provided around the driving shaft 2 and is of a diameter equal to the diameter of the pitch circle of the driving sun wheel 4. The said rollers 16 and 17 also contact with and travel around roller tracks or bearings 19 and 20, respectively, provided on the internal surface of the annulus 12, the diameters of the said roller tracks 19 and 20 being equal to the diameter of the pitch circle of the internal teeth 15 of the annulus. The said rollers 17 are each provided with a reduced circular portion 21 constituting another roller or bearing surface and having a diameter equal to the diameter of the pitch circle of the smaller planet pinion 6. Each compound planet is also provided with another roller or circular bearing surface 22 having a diameter equal to that of the reduced roller portion 21 of the roller 17. The driven sun wheel 7 is provided at its sides with rollers or circular bearing surfaces 23 and 24 which are each of a diameter equal to the pitch circle of its teeth and which engage respectively with the rollers or bearing surfaces 21 and 22 on the three compound planet pinions so that the driven sun wheel (which is of annular formation as aforesaid) is supported within and by the said rollers or supports 21 and 22 on the equi-spaced compound planet pinions. The rollers or bearing surfaces 23 and 24, particularly the former, are made separate from the driven sun wheel 7 and the compound roller supports 17 and 21 are made separate from the compound planet pinion as shown in Figure 4, in order to facilitate assembly of the parts. The compound roller supports 17 and 21 are held against endwise displacement on the compound planet by a ring 21*a*. The internal gearing and associated parts after assembly are finally held in position by the end cage plate 9 which is bolted to the cage 10 and the other cage plate 8 by the bolts 11. The various pitch circle rollers, roller tracks and supports provide antifrictional journals or bearings which properly support the various parts and insure correct meshing of the gear teeth while they relieve the bearings 5*a* and 6*a* of the compound planet pinions of separation loads and centrifugal loads and it is this construction that renders possible the use of the annular driven sun wheel 7 which, having no hub or similar central support, enables means to be provided for passing into or through it to connect or engage different parts of the gearing as hereinafter described. In the example shown, the said pitch circle rollers and the like are so constructed as to serve as thrust bearings and to prevent undesirable axial or endwise displacement by cooperating with side supports or surfaces, flanges or the like at or near the pitch circle diameters on adjacent and coacting rollers or the like. For this purpose, the roller support 18 and the roller track 19 are provided with flanges 18*a* and 19*a* that fit in grooves 16*a* in the roller 16, and the roller 23 engages with side surfaces or flanges at 23*a* on or adjacent to the roller 17 while the roller 24 engages with side surfaces or flanges at 24*a* on or adjacent to the roller 22. In this manner the parts are held against axial or endwise thrust or displacement in both directions. This construction also permits of the use of helical gear wheels and pinions without the use of ordinary thrust bearings. In assembling the rollers 16 and the compound planets 5 and 6 they are placed within the track 19 and internal teeth 15 in the annulus respectively so as to lie against each other and after placing the roller supports 18 and 24 in the central position, they can be rolled around these supports into their proper position to permit of other parts being fitted or assembled.

The inner end of the driving shaft 2, the annular driven sun wheel 7, the end cage plate 9 and the annulus plate 13, are provided with internally disposed dogs or teeth 2*a*, 7*a*, 9*a* and 13*a*, respectively. Splined around the said driven shaft 3 is a slidable sleeve 25 having external dogs 25*a* which are adapted to engage at different times with any one of the sets of dogs 2*a*, 7*a*, 9*a* and 13*a* by slidable movement of the sleeve in either direction, for which purpose the sleeve can be slidably moved in and through the annular driven sun wheel 7. The said dogs 25*a* are preferably but not necessarily of such length that while they can engage with the dogs 7*a*, they can when engaging with the dogs 2*a* also engage with the dogs 7*a* for the purpose of locking the gearing so that it will rotate bodily. Interrupting, balking or synchronizing means, preferably as shown and described in my copending application Serial No. 487,187, are provided for the purpose of preventing the dogs 25*a* on the slidable sleeve 25 from engaging with the dogs 7*a* on the driven sun wheel 7 or with the dogs 2*a* on the driven shaft 2, until such time as the rotating members to be engaged attain rotational synchronism. On the exterior of the cage plate 8, peripheral dogs or teeth 8*a* are formed and similar dogs or teeth 12*a* are formed on the rear part of the annulus, locking means being provided for engaging with these external dogs or teeth to hold either the cage 10 or the annulus 12 against rotation. The sleeve 25 is slidably moved for the purpose of engaging its dogs 25*a* with any of the sets of dogs 2*a*, 7*a*, 9*a* or 13*a* by means of an operating lever 26. The balking or synchronizing means may comprise a plate or ring 41 loosely mounted around a coned part on the diaphragm or web 1*a* on the gear box casing so that it is free to be maintained by the action of gravity in frictional contact with the end face or plate 13 of the annulus 12 for which purpose the ring 41 is provided with a frictional surface as shown in Figure 4. Similar balking or synchronizing means 51 are provided for preventing engagement of the locking pawls (not shown) with the cage dogs 8*a*.

While I have conventionally shown the interrupting or synchronizing means associated with a positive change speed gearing, as covered in my copending application Serial No. 487,187, it is to be understood that the interrupting means may be located at any suitable position in the transmission so that upon the latter being interrupted during gear change, it remains interrupted until the rotational speeds of the members to be connected are substantially equalized.

The form of the invention herewith shown and illustrated is merely a preferred embodiment and obviously, such mechanical changes may be made as fall within the purview of one skilled in the art without departing from the spirit of the invention and the scope of the appended claims, in the wording of which claims the expression "propeller shaft" is intended to describe and include any shaft which transmits power from the change speed gearing to the road wheels or propellers.

I claim:—

1. A power transmission for motor vehicles comprising in combination an engine shaft, a driven shaft, and a propeller shaft, a positive change speed gearing connected to said driven and propeller shafts, said transmission having a synchronizer operatively associated therewith, means to cause change of gear ratios in said transmission and actuate said synchronizer, a brake mounted on said driven shaft, a hydraulic power transmitter interposed between said engine and driven shafts, said transmitter comprising an impeller connected to the engine shaft and a turbine element connected to the driven shaft, whereby at low speeds the change of gear ratios may be effected in said transmission through the medium of said synchronizer and said hydraulic transmitter and similar changes may be made at high speeds through the medium of said synchronizer, brake, and transmitter.

2. A power transmission mechanism for motor driven vehicles comprising in combination an engine shaft, a driven shaft, a propeller shaft, a hydraulic power transmitter interposed between said engine and driven shafts, said transmitter comprising an impeller element connected to the engine shaft and a turbine element connected to the drive shaft, a positive change speed gearing located between said driven shaft and the propeller shaft, synchronizing means of the type in which power is transmitted bi-directionally through material under shear or bending loads operatively associated with the transmission mechanism, and means causing change of gear ratio in said transmission mechanism, whereby a change of gear ratio may be effected while drive is interrupted by the functioning of said synchronizing means, and a brake acting upon said turbine element whereby the change of gear ratio can be effected more rapidly through the medium of said brake functioning to cause or increase slip in the hydraulic transmitter.

3. A power transmission mechanism for motor driven vehicles comprising in combination an engine shaft, a driven shaft, a propeller shaft, a hydraulic power transmitter interposed between said engine and driven shafts, said transmitter comprising an impeller element connected to the engine shaft and a turbine element connected to the driven shaft, a valve adapted to be inserted into the hydraulic circuit for the purpose of controlling the circulation of the fluid in the transmitter, and means for actuating said valve, a positive change speed gearing located between said driven shaft and the propeller shaft, synchronizing means operatively associated with the transmission mechanism, and means causing change of gear ratio in said transmission mechanism, whereby a change of gear ratio may be effected while drive is interrupted by the functioning of said synchronizing means.

4. A power transmission mechanism for motor driven vehicles comprising in combination an engine shaft, a driven shaft, a propeller shaft, a hydraulic power transmitter interposed between said engine and driven shafts, said transmitter comprising an impeller element connected to the engine shaft and a turbine element connected to the driven shaft, a valve adapted to be inserted into the hydraulic circuit for the purpose of controlling the circulation of the fluid in the transmitter, and means for actuating said valve, a positive change speed gearing located between said driven shaft and the propeller shaft, synchronizing means operatively associated with the transmission mechanism, and means causing change of gear ratio in said transmission mechanism, whereby a change of gear ratio may be effected while drive is interrupted by the functioning of said synchronizing means, and a brake acting upon said turbine element whereby the change of gear ratio can be effected more rapidly through the medium of said brake functioning to cause or increase slip in the hydraulic transmitter.

PIERO MARIANO SALERNI.

DISCLAIMER

Re. 19,428.—*Piero Mariano Salerni*, Westminster, England. POWER TRANSMISSION MECHANISM. Patent dated January 15, 1935. Disclaimer filed January 19, 1937, by the patentee.

Hereby enters disclaimer as follows with respect to claims 1, 2, 3, and 4 of said patent:

Your petitioner disclaims from claim 1 of said patent any "synchronizer" which does not, when actuated for the purpose of making change of gear ratio, so interrupt connection between the "driven shaft" and the "propeller shaft" that neither can be caused to transmit power to the other under any conditions of direction of rotation or of speed imparted to said shafts or either of them, and also disclaims from said claim any "synchronizer" in which the drive interrupting elements thereof are not prevented, during reconnecting movement, from coming into contact while their speeds of rotation substantially differ.

Your petitioner disclaims from each of claims 2, 3, and 4 of said patent any "synchronizing means" which does not, when operated for the purpose of making change of gear ratio, so interrupt connection between the "driven shaft" and the "propeller shaft" that neither can be caused to transmit power to the other under any conditions of direction of rotation or of speed imparted to said shafts or either of them, and also disclaims from each of said claims any "synchronizing means" in which the drive interrupting elements thereof are not prevented, during reconnecting movement, from coming into contact while their speeds of rotation substantially differ.

[*Official Gazette February 23, 1937.*]